United States Patent [19]

Bryant et al.

[11] Patent Number: 4,504,710

[45] Date of Patent: Mar. 12, 1985

[54] DUAL TERMINAL FOR DYNAMOELECTRIC MACHINE STARTING SWITCH

[75] Inventors: Jimmy R. Bryant; Waldemar W. Mertens, both of Greene County, Ark.; Frances A. Kenny, St. Louis County, Mo.

[73] Assignee: Emerson Electric Co., St. Louis, Mo.

[21] Appl. No.: 448,949

[22] Filed: Dec. 13, 1982

[51] Int. Cl.³ ..................... H01H 35/10; H02K 11/00

[52] U.S. Cl. .................................. 200/80 R; 200/293; 310/68 E; 310/71; 339/14 R

[58] Field of Search .................. 200/1 R, 80 R, 67 D, 200/153 V, 284; 310/68 R, 68 E, 71; 339/14 R, 222

[56] References Cited

U.S. PATENT DOCUMENTS

| | | | |
|---|---|---|---|
| 2,934,740 | 4/1960 | Gard | 339/222 |
| 3,209,093 | 9/1965 | Simpson | 200/80 R |
| 3,573,692 | 4/1971 | Stetson | 339/222 X |
| 4,160,885 | 7/1979 | Ellicott et al. | 200/5 R X |
| 4,178,523 | 12/1979 | Lyerly | 310/68 R X |
| 4,198,583 | 4/1980 | Anderson et al. | 310/71 |

*Primary Examiner*—J. R. Scott
*Attorney, Agent, or Firm*—Polster, Polster and Lucchesi

[57] ABSTRACT

An integral dual terminal assembly for the starting switch of a fractional horsepower induction motor is disclosed in which the dual terminal has a pair of fixed contact supports carrying fixed electrical contacts within the housing of the starting switch in a predetermined spaced relation with a jumper bus extending between the fixed contact supports such that the fixed contacts are electrically common relative to one another.

1 Claim, 8 Drawing Figures

FIG. 4.
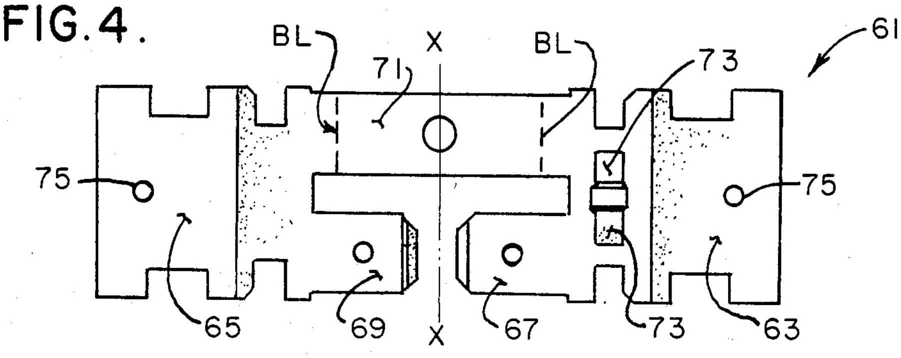
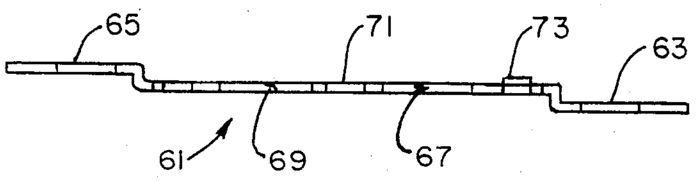
FIG. 5.
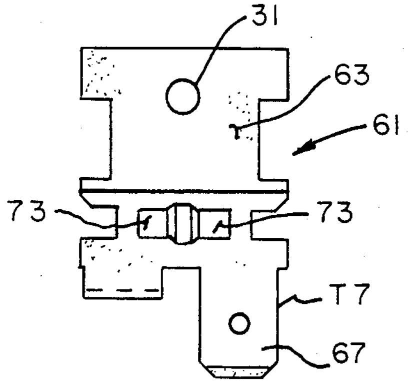
FIG. 6.
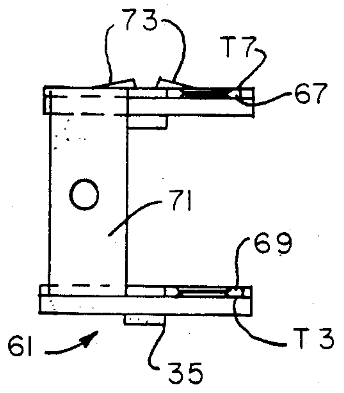
FIG. 7.
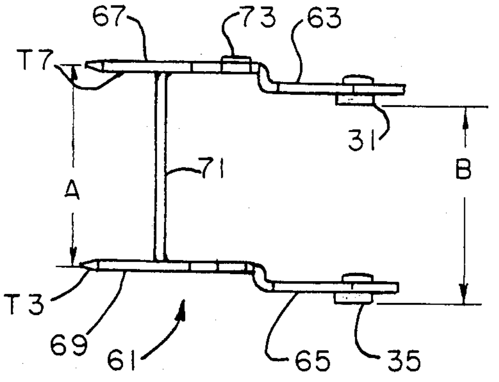
FIG. 8.

DUAL TERMINAL FOR DYNAMOELECTRIC MACHINE STARTING SWITCH

BACKGROUND OF THE INVENTION

This invention relates to a dual terminal contact assembly for the starting switch of a dynamoelectric machine (e.g., a fractional horsepower induction motor).

Typically, fractional horsepower induction motors have a stator assembly including a stator core made of a stack of laminations of suitable ferromagnetic material with each of the laminations having a central opening therein and with the central openings forming a longitudinal bore extending through the stator core. A rotor assembly is rotatable within the bore of the stator core and the rotor assembly typically includes a coaxial rotor shaft. The stator assembly further includes end shields or bearing supports for receiving and for journalling the rotor shaft and for holding the rotor centered within the bore of the stator. The stator includes a plurality of coils of wire inserted into slots extending radially outwardly from the bore of the stator core with these coils constituting the windings of the motor. Typically, the windings include different poles or separate windings which may be selectively connected to a source of electrical power for startup of the motor and for operation of the motor at one or more predetermined operational speeds.

Further, such motors are provided with a starting switch actuable by a centrifugal actuator carried by the rotor shaft so as to permit energization of the main windings of the motor and an auxiliary winding during startup of the motor to insure that the motor has sufficient starting torque. Upon the motor attaining a predetermined speed, the centrifugal actuator actuates the starting switch so as to de-energize the auxiliary winding. Upon shutdown or de-energization of the motor, the centrifugal actuator will, upon slowing of the rotor, reset the starting switch so that upon re-energization, the auxiliary winding is again energized. Additionally, the starting switch may include a number of other functions, such as controlling operation of the motor at different speeds of operation. In certain applications, such as electric clothes dryers, other contact sets may be provided in the motor which automatically energize and de-energize the electric heating elements of the clothes dryer upon startup and shutdown of the motor.

Reference may be made to such prior U.S. patents as U.S. Pat. Nos. 3,381,197, 3,691,415, 3,790,730 and 4,284,864 which disclose various fractional horsepower electric motors, centrifugal actuators and starting switches in the same general field as the present invention.

As shown in FIG. 6 of the above-noted U.S. Pat. No. 3,691,415, in some applications, the starting switch is provided with two movable switch arms which make and break circuits with respective fixed contacts. In certain applications, the fixed contacts are electrically connected via lead wires to a common electrical source, such as one of the power leads for the motor. However, the necessity of providing individual lead wires for each of the fixed contacts added considerably to the expense and the complexity of the motor and the requirement of additional lead wires provided additional sources of potential failure due to breakage of the lead wires and the terminals.

In the co-assigned U.S. Pat. No. 4,178,523 to Harold G. Lyerly, a switch jumper strap is disclosed in which a one-piece strip of electrically conductive material was fitted onto the ends of preselected terminals of the starting switch so as to provide a common electrical bus connection between the selected terminals and to eliminate the requirement of external jumper lead wires. While the switch jumper strap disclosed in U.S. Pat. No. 4,178,523 worked well for its intended purpose, it was still necessary that separate terminals for supporting the fixed contacts within the starting switch and a separated switch jumper strap be provided.

Still further, there has been a longstanding need for a terminal in a starting switch which could be readily installed in the starting switch housing, but yet was securely held in place relative to the housing without undue movement of the terminal relative to the housing which could adversely affect operation of the switch.

SUMMARY OF THE INVENTION

Among the several objects and features of this invention may be noted the provision of a starting switch for a dynamoelectric machine, such as described above, having at least one pair of movable switch arms and contacts and having a one-piece, dual terminal support for a pair of fixed contacts cooperable with the movable contacts in which the fixed contacts are electrically common with one another;

The provision of such a starting switch in which the terminals and the supports for the above-said fixed contacts are of one piece construction thus reducing the number of parts required for the starting switch and correspondingly reducing the complexity and the time required to assemble the starting switch;

The provision of such a starting switch in which the pair of fixed contacts by the one-piece dual terminal are accurately spaced one from another within the starting switch thereby to insure making and breaking of the respective circuits in a desired timed relation;

The provision of such a starting switch which eliminates the necessity for external jumper wires or straps;

The provision of a terminal for a starting switch, as above-described, in which the terminal may be readily installed in the starting switch housing and in which relative movement between the terminal and the housing is substantially eliminated;

The provision of such a terminal which does not require that close tolerances be maintained on either the terminal or the switch housing and yet which is easy to install in the housing; and The provision of such a starting switch for dynamoelectric machine which is of simpler construction, which has fewer parts, which is less expensive to manufacture than prior starting switches, and which is reliable in operation.

Other objects and features of this invention will be in part apparent and in part pointed out hereinafter.

Briefly stated, this invention is intended for use in a dynamoelectric machine having a stator and a rotor. The stator comprises a core having a bore therethrough for rotatably receiving the rotor. The rotor has a shaft and the stator further includes a bearing support secured to the core for receiving and journalling the rotor shaft. The stator further comprises a plurality of coils of wire inserted into slots formed in the core so as to constitute the windings of the dynamoelectric machine. A centrifugal actuator is rotatable with the rotor shaft and a starting switch is carried by the stator. The starting switch has a plurality of terminals connected to a plurality of leads connected to the windings for energization of the motor and the switch is actuable upon the startup and shutdown of the dynamoelectric machine. More specifically, the switch comprises a housing of suitable electrical insulative material and the housing has at least one switch arm movable therewithin via the centrifugal actuator from a first position to a second position. Specifically, the improvement of this invention is defined to comprise an integral (i.e., one-piece) dual terminal carrying a pair of fixed contacts within the housing, this dual terminal comprising a first fixed contact support carrying one of the pair of fixed contacts and a second fixed contact support carrying the other of the pair of fixed contacts and a bus portion integral with the first and second contact supports so that the first and second fixed contacts are electrically common with one another.

Further, this invention may be described as a starting switch for a dynamoelectric machine with the dynamoelectric machine and the starting switch being generally similar to that described above wherein a unitary dual terminal support for the pair of fixed contacts is provided. This dual terminal support has a first support within the housing for fixedly supporting the first fixed contact and a second support within the housing for fixedly supporting the second fixed contact. A jumper bus integral with the first and second fixed contact supports is provided so as to electrically interconnect the fixed contacts.

Still further, this invention relates to a starting switch for a dynamoelectric machine. The switch has a housing of electrical insulative material, at least one fixed contact within the housing, and at least one movable contact movable within the housing for making and breaking electrical contact between the fixed and removable contacts. Terminal means is provided for supporting the fixed and movable contacts, the housing having one or more slots therein for receiving the terminal means with the latter extending exteriorly of said housing via the slots. More specifically, this invention comprises resilient means formed integrally with the terminal means engageable with the portion of the housing defining the slot receiving the terminal means for resiliently supporting the terminal means in predetermined position relative to the housing.

BRIEF DESCRIPTION OF THE DRAWINGS

FIG. 4 is a plan view of the dual terminal support of the present invention after an intermediate forming or blocking operation;

FIG. 5 is a front elevational view of FIG. 4;

FIG. 6 is a top plan view of the dual terminal support after it has been formed in its final configuration for insertion into the switch housing;

FIG. 7 is a front elevational view of the dual terminal support shown in FIG. 6; and FIG. 8 is a right side elevational view of the dual terminal support as it is illustrated in FIG. 7 showing the dual terminal support in generally the same position as it is installed within switch housing, as shown in FIG. 3;

Corresponding reference characters indicate corresponding parts throughout the several views of the drawings.

DESCRIPTION OF PREFERRED EMBODIMENTS

Figure 1:
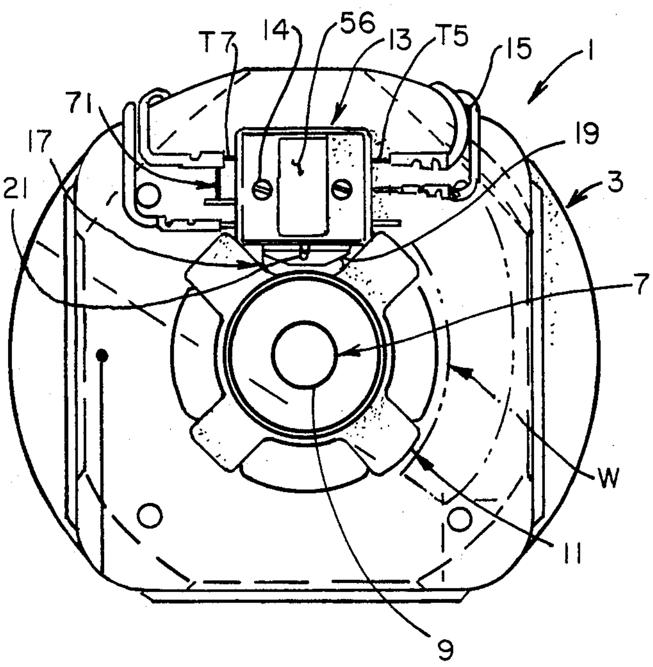
FIG. 1 is an end elevational view of a dynamoelectric machine (e.g., a fractional horsepower induction motor) illustrating a starting switch of the present invention installed on the end shield of the motor actuable by means of a lever interconnected to the centrifugal actuator of the motor, a plurality of electrical leads connected to male terminals extending outwardly from the starting switch, and a dual terminal support.
Figure 2:
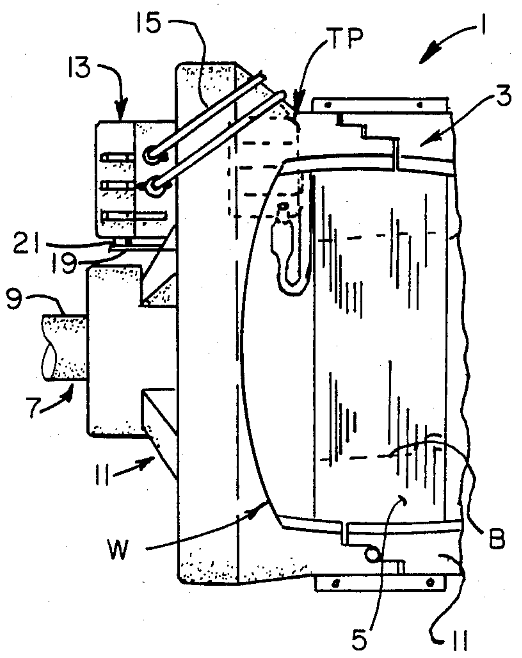
FIG. 2 is a right side elevational view of the motor shown in FIG. 1 with the right end of the motor broken away.

Referring now to the drawings, and particularly to FIGS. 1 and 2, a dynamoelectric machine (e.g. a fractional horsepower induction motor) is indicated in its entirety by reference character 1. More specifically, motor 1 is shown to include a stator assembly, as generally indicated at 3. The stator assembly comprises a core 5 made of a stack of laminations of suitable plate-like ferromagnetic material prepunched to have a central longitudinal bore B extending longitudinally therethrough and further having a plurality of blind slots (not shown) extending radially outwardly from bore B in a manner well known to those skilled in the art. A plurality of coils of magnet wire are inserted in the blind slots and thus constitute the windings W of the motor.

Further, motor 1 includes a rotor assembly, as generally indicated at 7, including a rotor body (not shown) mounted within bore B and rotatable therewithin and further including a rotor shaft 9 extending axially outwardly from the rotor body. The motor further includes an end shield 11 (also referred to as a bearing support) at each end of core 5 for receiving and for journalling rotor shaft 9 in suitable bearings carried by the end shield. As is conventional in many fractional horsepower induction motors, a so-called starting switch, as indicated at 13, is mounted on the end shield 11 for controlling operation of the motor in a manner as will be explained more fully hereinafter. As shown, screws 14 extending through the starting switch securely mount the starting switch to the end shield and electrical lead wires 15 interconnect the selected terminals of the starting switch to a thermal protector TP and to windings W of the motor for operation of the motor upon energization and de-energization thereof.

Figure 3:
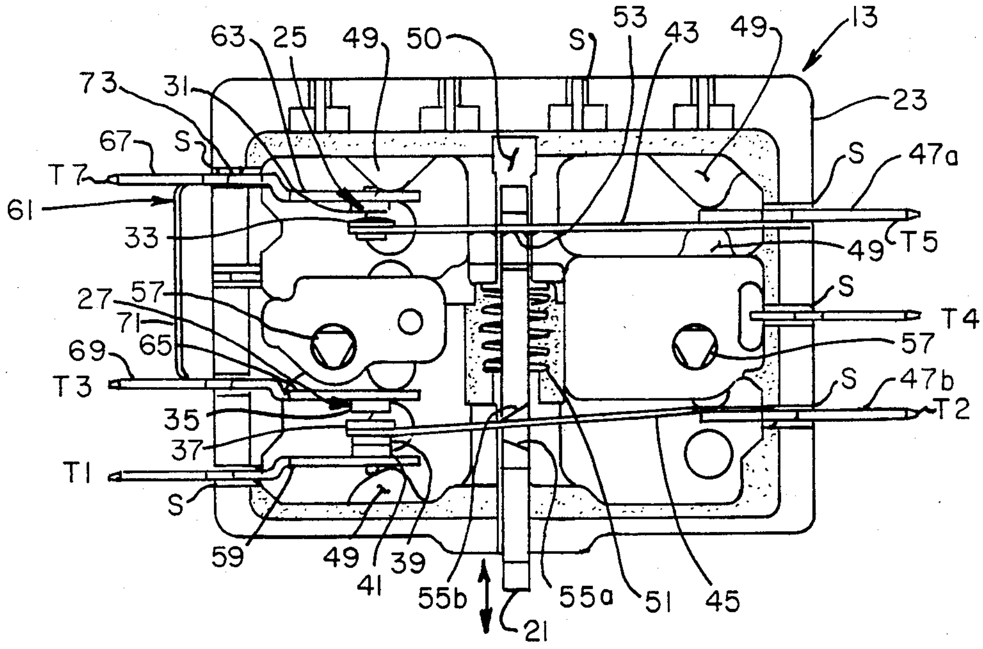
FIG. 3 is a front elevational view of the starting switch shown in FIG. 1 on a greatly enlarged scale with the front cover plate of the starting switch removed so as to show the internal components of the starting switch, the starting switch being illustrated in its run position.

As is typical, motor 1 includes a centrifugal actuator 17 mounted on rotor shaft 9 and rotatable therewith. The construction and operation of centrifugal actuators is well-known to those skilled in the art and thus will not be disclosed in detail as it does not, per se, constitute a part of the improvement of this invention. A linkage 19 is provided so as to interconnect centrifugal actuator 17 to the operating plunger 21 of starting switch 13 for actuation of the starting switch between an off position when the motor is de-energized and a run position (as shown in FIG. 3) when the motor is energized. The switch is actuated upon startup and shutdown of motor 1. In many fractional horsepower induction motors, the windings W comprise a main winding and an auxiliary winding. The auxiliary winding is typically only energized during startup of the motor so as to insure that the motor has sufficient starting torque. When the motor attains a predetermined operational speed at which point it has sufficient torque, centrifugal actuator 17 actuates starting switch 13 so as to de-energize the auxiliary winding. Upon de-energization or shutdown of the motor, as the speed of rotor shaft 9 slows down, the centrifugal actuator will again actuate starting switch 13 so as to reposition the contacts therewithin so that upon re-energization of the motor, the auxiliary winding will be again energized. Those skilled in the art will recognize that the construction and operation of motor 1 as heretofore described is conventional and is well known.

Turning now to FIG. 3, a more detailed description of starting switch 13 will be provided. Starting switch 13 includes a housing 23 preferably molded of a suitable synthetic resin material having electrically insulative properties. As indicated at T1–T7, a plurality of male electrical terminals extend outwardly from opposite sides of housing 23 for connection to lead wires 15, as shown in FIGS. 1 and 2. As indicated at 25, a first set of contacts is provided within housing 23 constituting a single pole single throw (SPST) switch. Further, a second set of contacts, as generally indicated at 27, is provided within the housing constituting a single pole double throw (SPDT) switch. More specifically, the first set of contacts is comprised by a first fixed contact 31 and by a first movable contact 33. The second set of contacts 27 constituting the single pole double throw switch is constituted by a second fixed contact 35, by a second movable contact 37, by a third movable contact 39, and by a third fixed contact 41. The first movable contact 33 is carried by and is movable with a cantilevered, flexible, movable switch arm 43 and the second and third movable contacts 37 and 39 are carried by a second, cantilevered, flexible, movable switch arm 45. The movable switch arms 43 and 45 are fixedly secured (e.g., riveted or spot welded) to a respective male terminal 47*a*, 47*b* fixed carried by housing 23 so as to be cantilevered supported within housing 23. Terminals 47*a*, 47*b* are securely held in position within housing 23 by means of support abutments 49 molded in place within the housing.

As shown in FIG. 3, actuator plunger 21 is movable inwardly and outwardly relative to housing 23 (as indicated by the arrows in FIG. 3) between an outward position (as shown in FIG. 3) when the switch is in its run position and an inward position (not shown). A slot 50 is provided within housing 47 to permit plunger to move relative to the housing between its outward and inward positions in response to actuation by centrifugal actuator 17 acting through linkage 19 which bears against the end of plunger 21 extending outwardly beyond housing 23. A coil spring 51 interposed between a portion of housing 23 and a portion of plunger 21 resiliently biases plunger 21 toward its outward position (i.e., the position as shown in FIG. 3). In its outward position, the first set of contacts 25 is shown to be in its open position thereby breaking continuity between terminal T5 and terminal T7, and the second set of contacts 27 is shown to be in a position such that the second fixed contact 35 and the second movable contact 37 are separate from one another thereby to break continuity between terminal T2 and terminal T3, while the third movable contact is in engagement with the third fixed contact 41 so as to provide electrical continuity between terminal T2 and terminal T1.

Actuating plunger 21 includes a first actuating surface 53 thereon engagable with the bottom face of the first movable switch arm 43 so as to move the switch arm and the first movable contact 33 carried thereby from its open to its closed position in which it makes contact with the first fixed contact 31 upon movement of plunger 21 from its outer to its inner position thereby to make an electrical circuit between terminal T5 and terminal T7. Additionally, plunger 21 includes second and third actuating surfaces 55*a* and 55*b* engagable with the upper and lower faces of the second movable switch arm 45 for positively moving the second switch arm between its first position (as shown in FIG. 3) when plunger 21 is in its outer position in which the third movable and fixed contact 39 and 41 are engagement with one another when the plunger is in its outer position and so as to break the circuit between contacts 39 and 41 as the plunger is moved from its outer position toward its inner position and so as to make contact between contacts 35 and 37. As can be seen in FIG. 3, the first switch arm 43 is a flexibly resilient member which is biased towards its normally open position and is in engagement with its respective actuating surface 53 of plunger 21. Further, as shown in FIG. 3, with plunger 21 in its outer position, spring 45 biases the second actuating surface 55*b* of the plunger into positive engagement with the upper face of the second switch arm 45 thereby to positively maintain contact between contacts 39 and 41. Upon movement of the actuator between its outer and inner positions, it will be noted that there is some lost motion of plunger 21 relative to switch arm 45 because of the spaced distances between actuating surfaces 55*a* and 55*b*. In certain applications, it will be appreciated by those skilled in the art that the distance plunger 21 must move so as to make contact between the first set of contacts 25 and so as to break electrical connection between contacts 41 and 39 may be such that the making and breaking of the contacts is sequentially timed in a desired manner relative to one another.

An insulative front cover, as indicated at 56 in FIG. 1, overlies the front of switch housing and encloses the switch housing. Attachment screws 14 are insertable through openings 57 provided in the switch housing and threadably engage threaded openings (not shown) provided in end shield 11 thereby to securely mount starting switch 13 on end shield 11. As indicated at 59, a fixed contact terminal support is inserted in a respective slot S of housing 23 and carries the fixed contact 41 with the outwardly extending portion of this fixed contact support constituting terminal T1.

The construction and operation of starting switch 13, as heretofore described, is substantially conventional. Those skilled in the art will recognize that the construction and operation of starting switch 13 is merely illustrative of a number of alternative constructions of the starting switch on which the present invention may be utilized.

Referring still to FIG. 3, a dual contact support in accordance with this invention, as indicated in its entirety by reference character 61, constitutes terminals T3 and T7 and constitutes a support for fixed contacts 31 and 35 within housing 23 of starting switch 13. More specifically, dual contact support 61 includes a first fixed contact support 63 carrying the first fixed contact 31 and a second fixed contact support 65 carrying the second fixed contact 35. Dual contact support 61 is a one-piece, integral member made of electrically conductive material (e.g., a suitable brass alloy) and has a first male terminal blade 67 extending outwardly through a respective slot S in housing 23 so as to constitute terminal T7. Further, dual support 61 has a second male terminal blade 69 extending outwardly from housing 23 through its respective slot S so as to constitute terminal T3. An integral, bus bar or jumper 71 extends between the first and second fixed contact supports 63 and 65 so as to electrically interconnect the first and second fixed contact supports of dual contact terminal 61 thereby to make fixed contacts 31 and 35 and terminals T3 and T7 electrically common with one another. It will be appreciated that this integral common bus or jumper bar 71 eliminates the requirements of jumper wires and jumper straps as were heretofore required on prior art starting switches so as to make selected contacts and terminals of the starting switch electrically common with one another.

Referring now to FIGS. 4–8, the construction of the one piece, integral dual contact support 61 is shown in greater detail. Specifically, in FIGS. 4 and 5, a substantially flat blank of the dual contact support 61 is shown constructed of a suitable electrically conductive, resilient sheet metal alloy, such as a brass alloy. The first and second fixed contact supports 63 and 65 are respectively illustrated at the right and left hand ends of the dual contact blank and the common bus bar 71 is shown to be integral with and to interconnect the first and second contact supports. A pair of resilient securement barbs or tabs, as indicated at 73, is integrally formed in the portion of the dual contact support adjacent the first fixed contact support 63 for positive, resilient engagement with the portion of switch housing 23 defining slot S which receives the first fixed contact support 63 thereby to positively and resiliently locate and to substantially eliminate movement of the dual contact support 61 relative to housing 23. Further, apertures 75 are provided in the fixed terminal supports 63 and 65 for receiving respective fixed contacts 31 and 35 which are coined-in-place within the apertures. These fixed contacts 31 and 35 may be of a suitable metallic alloy so as to eliminate pitting and the like due to arcing upon making and breaking of the fixed contacts with their respective movable contacts.

After the dual terminal contact 61 has been formed in generally flat pattern as shown in FIGS. 4 and 5 and after fixed contacts 31 and 35 have been coined within aperture 75, the dual terminal is bent along bend lines BL (see FIG. 4) so as to form a generally U-shaped member (as shown in FIGS. 3 and 8) with terminal blades 67 and 69 spaced apart by a predetermined dimension A so as to be readily received in respective slots S formed in switch housing 23 and such that the contact faces of contacts 31 and 35 are spaced apart another predetermined dimension, as indicated by dimension B. In this manner, it will be understood that upon installation of the dual terminal support assembly 61 into switch housing 23 is readily accomplished in a one-step procedure in which the terminal blades 67 and 69 are inserted in their respective slots S so that tabs 73 were resiliently compressed by the portions of housing 23 defining slots S thereby to positively hold the terminal member relative to the switch housing and relative to abutments 49 within the switch housing which engage predetermined locations of fixed contact supports 63 and 65 so as to positively maintain contacts 31 and 35 in their desired spaced relation within switch housing 23. Thus, these resilient tabs 73 accommodate a relative wide range of tolerances in terminal 61 and in housing 23. It will be appreciated that by installing the one-piece dual contact support 61, considerable time can be saved over installing separate terminal supports for fixed contacts 31 and 35 and it will be further appreciated that the desired spacing between fixed contacts 31 and 35 can be more accurately maintained. It will further be appreciated that because of the common bus bar interconnecting contact supports 63 and 65 that the contacts 31 and 35 and the terminals T3 and T7 are electrically common to one another without the requirement of additional jumper wires or jumper straps.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

We claim:

1. In a dynamoelectric machine having a stator and a rotor, said stator comprising a core having a bore therethrough for rotatably receiving said rotor, said rotor having a shaft, said stator further including a bearing support for receiving and journalling said rotor shaft, said stator further comprising a plurality of coils of wire constituting the windings of said dynamoelectric machine, a centrifugal actuator rotatable with said rotor shaft, a starting switch carried by said stator, said switch having a plurality of terminals connected to a plurality of leads which are in turn connected to said windings for energization of said motor, said switch being actuable by said centrifugal actuator upon the startup and shutdown of said dynamoelectric machine, said switch comprising a housing of suitable electrical insulative material, wherein improvement comprises: an integral support member carrying a pair of fixed contacts within said housing, said support member comprising a first fixed contact support carrying one of said pair of fixed contacts, a second fixed contact support carrying the other of said pair of fixed contacts, said first and second supports being disposed within said housing and being spaced apart from one another, and a common bus portion located on the exterior of said housing, said common bus portion being integral with said first and second contact supports so that said first and second fixed contacts are electrically common with one another.

* * * * *